Jan. 4, 1927.
D. BRINK
CULTIVATOR
Filed Dec. 12, 1925
1,613,079
3 Sheets-Sheet 3
Fig. 3.
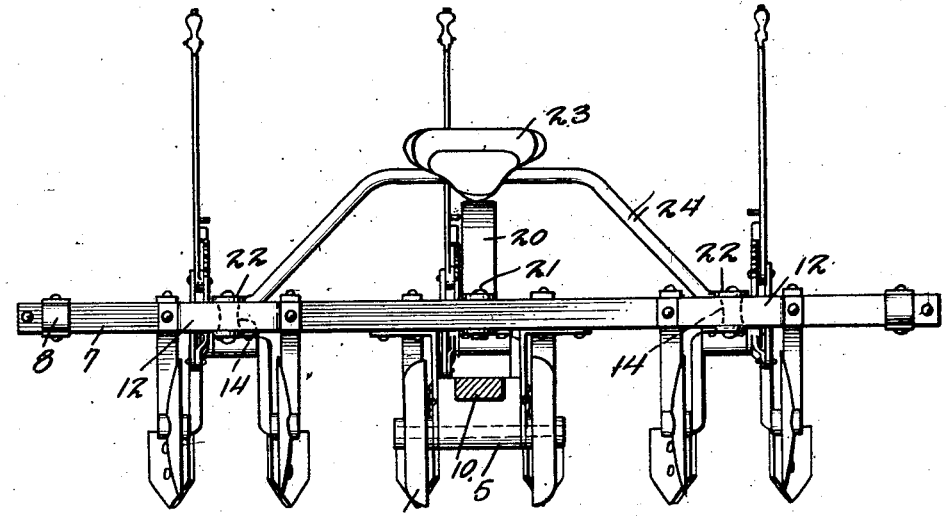
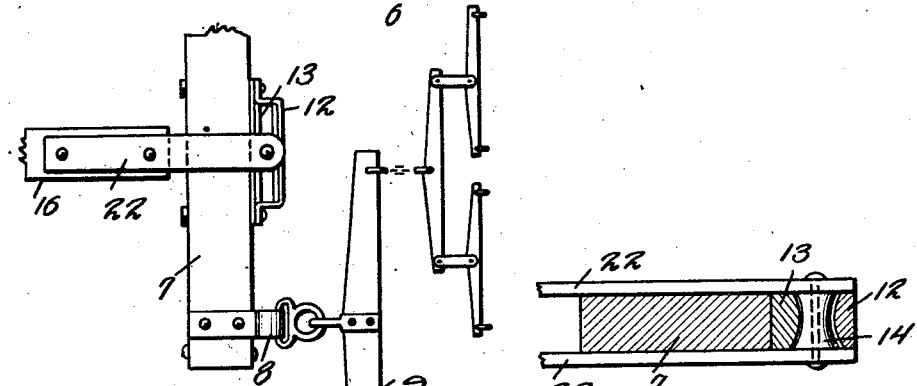
Fig. 5.
Fig. 4.
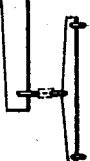
Dick Brink, Inventor
Witnesses
By Richard B. Owen
Attorney Patented Jan. 4, 1927.

1,613,079

UNITED STATES PATENT OFFICE.

DICK BRINK, OF PLATTE, SOUTH DAKOTA.

CULTIVATOR.

Application filed December 12, 1925. Serial No. 75,061.

This invention relates to improvements in cultivators, and has more particular reference to a device of this kind especially adapted to cultivate corn and other plants which are planted with a lister-plow in rows which are crooked and spaced varying distances apart.

The primary object of the invention is to provide a cultivator which will cultivate several rows of corn or other plants at the same time and which embodies a plurality of cultivating mechanisms that are automatically laterally adjustable so as to accommodate themselves to rows of different widths or distances apart or to follow crooked rows without damaging the plants.

A further object is to provide a cultivator of the above kind which is extremely simple and durable in construction as well as efficient in operation.

Other objects will appear as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view of a cultivator constructed in accordance with the present invention;

Figure 3 is a front elevational view of the device shown in Figure 1;

Figure 4 is an enlarged fragmentary section taken upon line 4—4 of Figure 2; and Figure 5 is a fragmentary plan view illustrating the manner of attaching a three horse evener to each end of the transverse beam of the cultivator frame.

Figure 1:
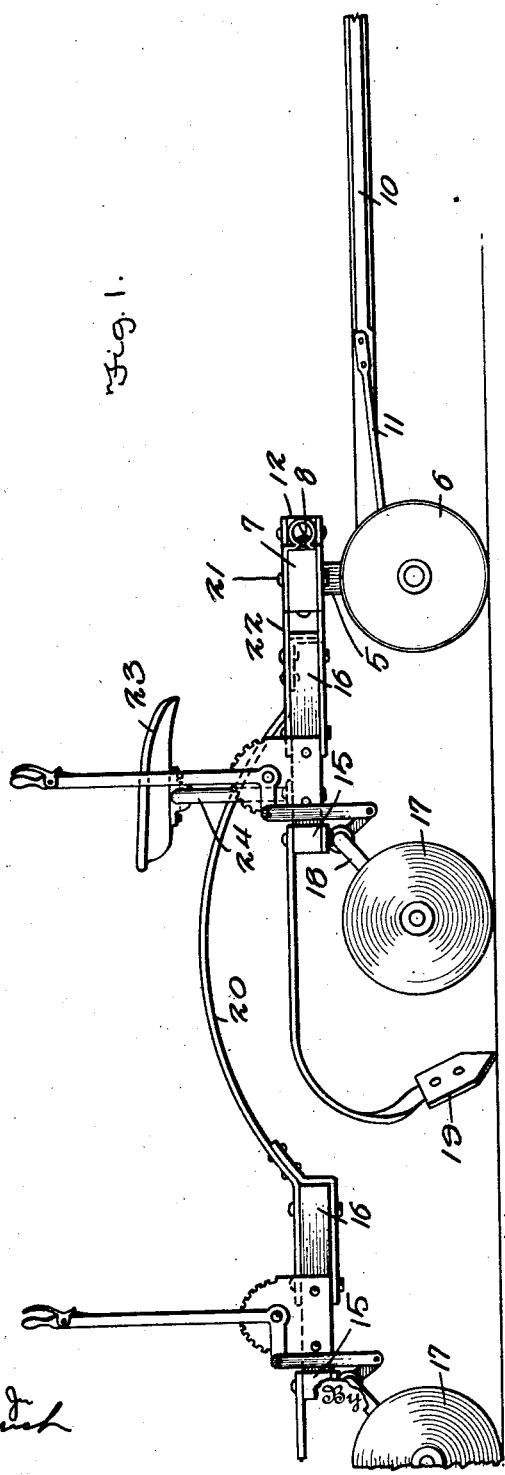

Referring more in detail to the drawings, the frame of the present machine consists of a truck 5 having dished supporting wheels 6 adapted to run in a furrow to guide the cultivator when drawn forwardly during the cultivating operation, and secured upon the truck 5 intermediate its ends is a horizontal transverse beam 7 which is provided at each end with a device 8 for facilitating connection of a three horse evener 9 thereto as shown in Figure 5. Rigidly connected to the truck 5 between the supporting wheels 6 and projecting forwardly from said truck is a tongue 10 which, together with the three horse eveners 9, constitutes means for facilitating hitching of six draft animals to the cultivator with three of the animals disposed at each side of the tongue. The tongue 10 is suitably braced relative to the truck as at 11.

Secured against the forward edge of the beam 7 at each side of the supporting wheels 6 and adjacent the ends of the beam 7 are U-shaped brackets 12 and tracks 13 which form transversely extending guide ways for rollers 14, one of which is adapted to move back and forth in each guide way laterally of the cultivator for a purpose which will presently become apparent.

The present cultivator embodies three cultivating mechanisms, each of which embodies a suitable frame 15 provided with a central longitudinal rigid beam 16, the frame being supported by disks 17 which are journaled upon the ends of a transversely disposed arched axle 18 carried by and depending from the frame 15. Suitable cultivator shovels 19 are connected by the frame 15 so as to be drawn along therewith, and one shovel 19 is disposed behind each disk 17 so that the shovels and disks of each cultivating mechanism straddle the row of plants to be cultivated thereby.

Figure 2:
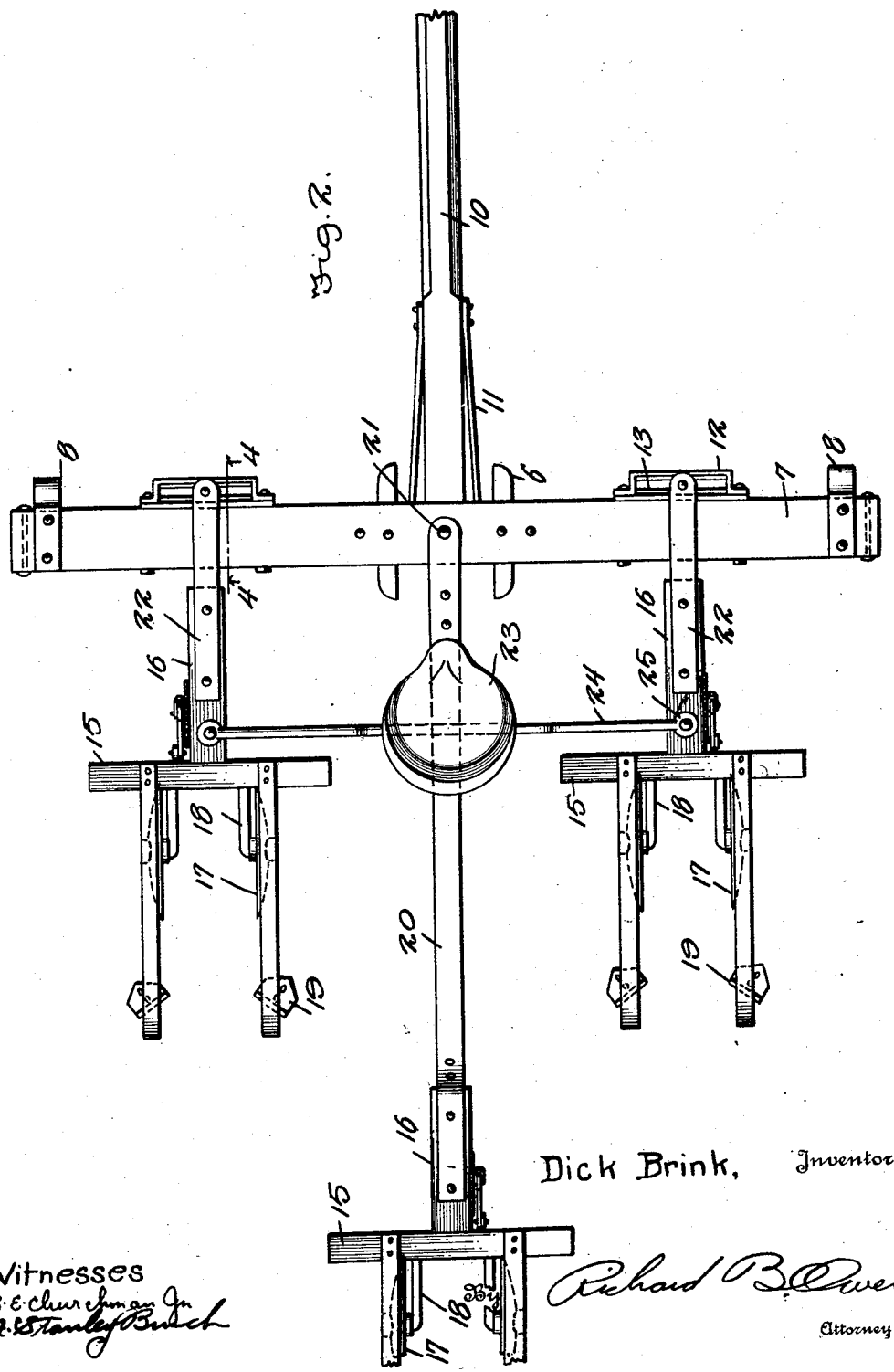
Figure 2 is a top plan view thereof.

The intermediate cultivating mechanism has the rear end of a longitudinal draft bar 20 secured to the longitudinal beam 16 thereof, and the forward end of this draft bar 20 is pivoted upon a vertical axis as at 21 to the central portion of the transverse beam 7. It is thus apparent that the draft bar 20 is hinged for horizontal swinging movement so as to permit lateral movement of the intermediate cultivating mechanism whereby the latter may adjust itself laterally and automatically as required. The remaining two or end cultivating mechanisms are disposed in advance of the central cultivating mechanism and at each side of the latter as shown clearly in Figure 2. Each side cultivating mechanism has a pair of strips 22 fastened to the longitudinal beam 16 thereof, respectively against the upper and lower sides of said beam 16, and these strips 22 project forwardly so as to straddle the adjacent portion of the beam 7. A roller 14 is journaled between the forward ends of each pair of strips 22, and it is thus apparent that the side cultivating mechanisms are connected with the beam 7 so as to be capable of lateral adjustment relative thereto. In other words, the rollers 14 may move back and forth in the guide-ways and allow the side cultivating mechanisms to automatically adjust themselves to rows of different widths and to follow crooked rows without injuring the plants.

In making short turns the central cultivating mechanism is allowed to swing laterally a material distance by making the draft bar 20 of upwardly arched form as shown in Figure 1 whereby the side cultivating mechanisms may pass under the bar 20 without interfering with the lateral swinging movement of the latter.

A seat 23 is shown mounted upon the intermediate portion of a transverse supporting bar 24 for accommodating the operator or attendant of the cultivator, the ends of the bar 24 being pivoted as at 25 to the longitudinal beams 16 of the side cultivating mechanisms. The pivotal connections 25 are preferably made quite loose so as to not interfere with the movement of the side cultivating mechanisms. However, other manners of supporting the seat 24 may be utilized and should the bar 24 be found undesirable for this purpose, the same may be eliminated.

From the above description, it will be seen that I have provided a cultivator which embodies cultivating mechanisms capable of movement to adapt themselves automatically to rows spaced at varying distances apart and to also follow crooked rows whereby the cultivating operation will be carried on without in any way injuring the plants.

What I claim as new is:—

1. In a cultivator of the class described, a truck provided with a rigid forwardly projecting draft tongue and having a pair of supporting wheels adapted to run in and engage the sides of a furrow, a transverse horizontal beam rigidly mounted intermediate its ends upon the truck, a transversely extending guideway on each end portion of the beam, a furrow guide cultivating mechanism pivotally connected with the beam between said guide-ways for free lateral movement, a furrow guide cultivating mechanism arranged in advance of and at each side of the first named cultivating mechanism, an element freely movable laterally in each guide-way adjacent each side cultivating mechanism, and a connection between each side cultivating mechanism and the adjacent laterally movable element.

2. A structure as specified in claim 1, wherein the connection between the first named cultivating mechanism and the beam embodies a longitudinal upwardly arched draft bar having its forward end pivoted to the beam, whereby said draft bar may swing laterally past the side cultivating mechanisms.

3. In a cultivator, a transverse horizontal frame member, a furrow guide cultivating mechanism pivotally connected with said frame member between its ends for free lateral movement, further furrow guide cultivating mechanisms at each side of the first named cultivating mechanism and in advance of the latter, and connections between the side cultivating mechanisms and the frame member including elements freely movable laterally of the frame member to allow the side cultivating mechanisms to automatically move laterally and follow rows of different widths or of crooked form.

4. In a cultivator of the character described, a furrow guide truck, fixed transverse guideways at each side of the truck, side furrow guide cultivating mechanisms having forwardly projecting beams, the front ends of said beams being connected to the truck by means including elements freely movable laterally in said guideways, and a further furrow guide cultivating mechanism arranged between and rearwardly of the first named cultivating mechanisms and having a forwardly projecting draft bar pivotally connected to the truck at its forward end for permitting free lateral movement of said last named cultivating mechanism.

In testimony whereof I affix my signature.

DICK BRINK.